United States Patent
New

(10) Patent No.: US 9,424,054 B2
(45) Date of Patent: Aug. 23, 2016

(54) DRIVER FILE CONVERSION SYSTEM

(71) Applicant: Dell Products L.P., Round Rock, TX (US)

(72) Inventor: Joshua New, San Francisco, CA (US)

(73) Assignee: Dell Products L.P., Round Rock, TX (US)

( * ) Notice: Subject to any disclaimer, the term of this patent is extended or adjusted under 35 U.S.C. 154(b) by 381 days.

(21) Appl. No.: 13/895,098

(22) Filed: May 15, 2013

(65) Prior Publication Data

US 2014/0344560 A1 Nov. 20, 2014

(51) Int. Cl.
*G06F 9/44* (2006.01)
*G06F 9/445* (2006.01)

(52) U.S. Cl.
CPC .......... *G06F 9/44505* (2013.01); *G06F 9/4411* (2013.01)

(58) Field of Classification Search
CPC ................................ G06F 9/4411; G06F 8/63
See application file for complete search history.

(56) References Cited

U.S. PATENT DOCUMENTS

| | | | |
|---|---|---|---|
| 6,804,774 B1 * | 10/2004 | Larvoire et al. | 713/2 |
| 7,334,157 B1 * | 2/2008 | Graf et al. | 714/13 |
| 7,565,517 B1 * | 7/2009 | Arbon | 713/1 |
| 7,743,242 B2 | 6/2010 | Oberhaus et al. | |
| 2003/0233644 A1 * | 12/2003 | Cohen et al. | 717/171 |
| 2007/0294703 A1 * | 12/2007 | Talu et al. | 719/310 |

OTHER PUBLICATIONS

Microsoft, General Syntax Rules for INF Files, Sep. 29, 2011, Microsoft Website via Way Back Machine.*
Microsoft, INF Version Section, Oct. 21, 2011, Microsoft Website via Way Back Machine.*
Microsoft, INF SourceDiskNames Section, Oct. 21, 2011, Microsoft Website via Way Back Machine.*
Microsoft, INF SourceDisksFiles Section, Oct. 21, 2011, Microsoft Website via Way Back Machine.*
Microsoft, INF Manufacturer Section, Oct. 22, 2011, Microsoft Website via Way Back Machine.*
Microsoft, INF Models Section, Oct. 22, 2011, Microsoft Website via Way Back Machine.*
Microsoft, INF DDInstall Section, Oct. 22, 2011, Microsoft Website via Way Back Machine.*
Microsoft, INF Strings Section, Oct. 21, 2011, Microsoft Website via Way Back Machine.*

* cited by examiner

*Primary Examiner* — Jaweed A Abbaszadeh
*Assistant Examiner* — Gary Collins
(74) *Attorney, Agent, or Firm* — Haynes and Boone, LLP

(57) ABSTRACT

A method for creating an offline script format driver file from an INF file includes replacing variables with associated value data. Version data and a unique identifier are captured and stored. Disk identification data is retrieved and combined with data that references the disk identification data in order to create and store a list of disk names and files within those disk names. A list is created of all possible models sections from value data included in a manufacturer value name to determine which models sections support which operating systems. Information that describes which models section is compatible with which operation system is created and stored. For DDInstall sections that include device driver installation details, sections directives that include registry actions or file actions are processed. The method provides an offline script format driver file that is operable to provide for offline driver installation in an information handling system (IHS).

20 Claims, 3 Drawing Sheets

DRIVER FILE CONVERSION SYSTEM

BACKGROUND

The present disclosure relates generally to information handling systems, and more particularly to driver file conversion system for information handling systems.

As the value and use of information continues to increase, individuals and businesses seek additional ways to process and store information. One option is an information handling system (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

IHS operating systems use driver files to install drivers on the IHS in order to use those drivers to operate or control devices attached to the IHS. For example, the WINDOWS® operating system uses plain text files, called information (INF) files, for installation of software and drivers. The INF files include all the information the operating system needs to install the driver, but the relationships in the data structure of the INF file are very complex. In some situations, it is desirable to take an offline image (e.g., when there is no access to a running instance of the operating system) on a first IHS and store that offline image on a second IHS. It is very complicated to install a driver using an INF file when there is no access to a running instance of the operating system, and requires the use of a special operating system tool along with the offline operating system each time the driver is installed on an offline image. Furthermore, without with complicated installation process that must be performed each time a driver is to be installed on an offline image, the operating system will likely have trouble booting due to differences in the hardware of the IHSs.

Accordingly, it would be desirable to provide an improved driver file system for offline image driver installation.

SUMMARY

According to one embodiment, an offline script format driver file creation system includes a processing system; a memory system coupled to the processing system and including instruction that, when executed by the processing system, cause the processing system to provide at least one engine that is operable to: read a driver installation file into the memory system such that a representation of the driver installation file is stored in the memory system; replace variables in the representation of the driver installation file with associated value data from a first section of the driver installation file that provides variable to string substitution values; process a second section in the representation of the driver installation file that provides information about the driver installation file and a type of device the driver installation file supports, wherein the processing the second section includes capturing version data and a unique identifier in the representation of the driver installation file and storing that version data and unique identifier in the memory system; process a third section in the representation of the driver installation file that provides a list of distribution disks that contain the files required for installation and operation of the driver installation file, a list of files used during installation of the driver installation file, and associated disks and directories on those disks, wherein the processing the third section includes retrieving disk identification data and combining the disk identification data with data that references the disk identification data in order to create and store a list of disk names and files within those disk names in the memory system; process a fourth section in the representation of the driver installation file that includes information used to identify operating systems supported by the driver installation file, wherein the processing of the fourth section creates a list of all possible models sections from value data included in a manufacturer value name to determine which models sections support which operating systems; process a fifth section in the representation of the driver installation file that includes operating system compatibility details for specific models of hardware, wherein the processing of the fifth section includes creating and storing information that describes which models section in the driver installation file is compatible with which operation system; and process a sixth section in the representation of the driver installation file that includes plug and play hardware identifications that the driver installation file is compatible with and, for each portion of the sixth section that includes device driver installation details, process sections directives in that portion that include registry actions or file actions; wherein the processing of the first section, the second section, the third section, the fourth section, the fifth section, and the sixth section provides an offline script format driver file that is operable to provide for offline driver installation in an information handling system (IHS).

DETAILED DESCRIPTION

For purposes of this disclosure, an IHS may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an IHS may be a personal computer, a PDA, a consumer electronic device, a display device or monitor, a network server or storage device, a switch router or other network communication device, or any other suitable device and may vary in size, shape, performance, functionality, and price. The IHS may include memory, one or more processing resources such as a central processing unit (CPU) or hardware or software control logic. Additional components of the IHS may include one or more storage devices, one or more communications ports for communicating with external devices as well as various input and output (I/O) devices, such as a keyboard, a mouse, and a video display. The IHS may also include one or more buses operable to transmit communications between the various hardware components.

Figure 1:
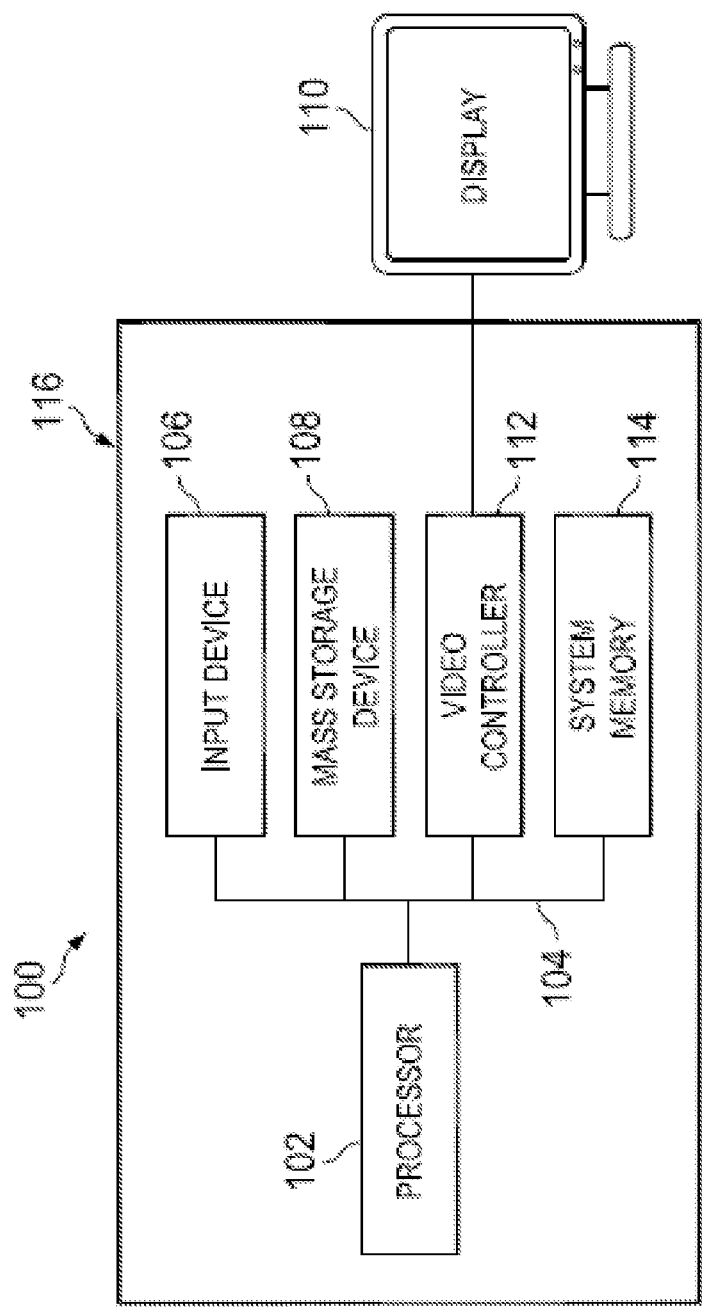
FIG. 1 is a schematic view illustrating an embodiment of an information handling system.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

The systems and methods of the present disclosure automatically convert a collection of conventional driver installation files to offline script format driver files that allows for offline driver installation in an IHS, i.e., installation of a driver in the IHS when an instance of the operation system is not booted, running, etc. The offline script format driver files, created from the conventional driver installation files by the systems and according to the methods described herein in a single offline preparation, may be booted on any of the models of devices that are supported by the conventional driver installation and may be packaged for use in installing the driver offline on any of a plurality of IHSs or operating systems instances. The offline script format driver files allow the movement of offline images between different IHS easily as long as the receiving IHS has the correct hardware for those offline script format driver files. Furthermore, if an offline image is to be moved to a destination IHS or IHS(s) that do not have the correct hardware for a given offline script format driver file, the correct collection of conventional driver installation files for the destination IHS's hardware may be converted on-the-fly to the correct offline script format driver files using the systems and methods of the present disclosure in order to enable movement of the offline image to the destination IHS(s). Thus, the systems and methods of the present disclosure allow for offline IHS image migration with a collection of conventional driver installation files by converting them to offline script format driver files at runtime, rather than having to rely on a repository of manually created offline script format driver files that may not include all the needed drivers for any IHS configuration.

In the embodiments discussed below, the collection of conventional driver installation files are INF driver files that are converted to offline script format driver files that include scripts that may be used to apply registry changes to an offline registry hive in order to prepare an offline WINDOWS® operating system image for retargeting to one or many different booting mechanisms such as, for example, Internet Small Computer System Interface (iSCSI) software initiator booting, local disk SCSI Host Bus Adapter (HBA) booting, Fiber Channel HBA booting, and/or a variety of other booting mechanisms known in the art. The offline script format driver files allow for the application of changes to a plurality of destination IHSs without having to reconvert the INF driver files. Furthermore, conversion of INF driver files to the offline script format driver files for use as part of an offline driver installation package may be performed on-the-fly or in order to provide the offline script format driver files for distribution as part of an offline driver installation package.

Figure 2:
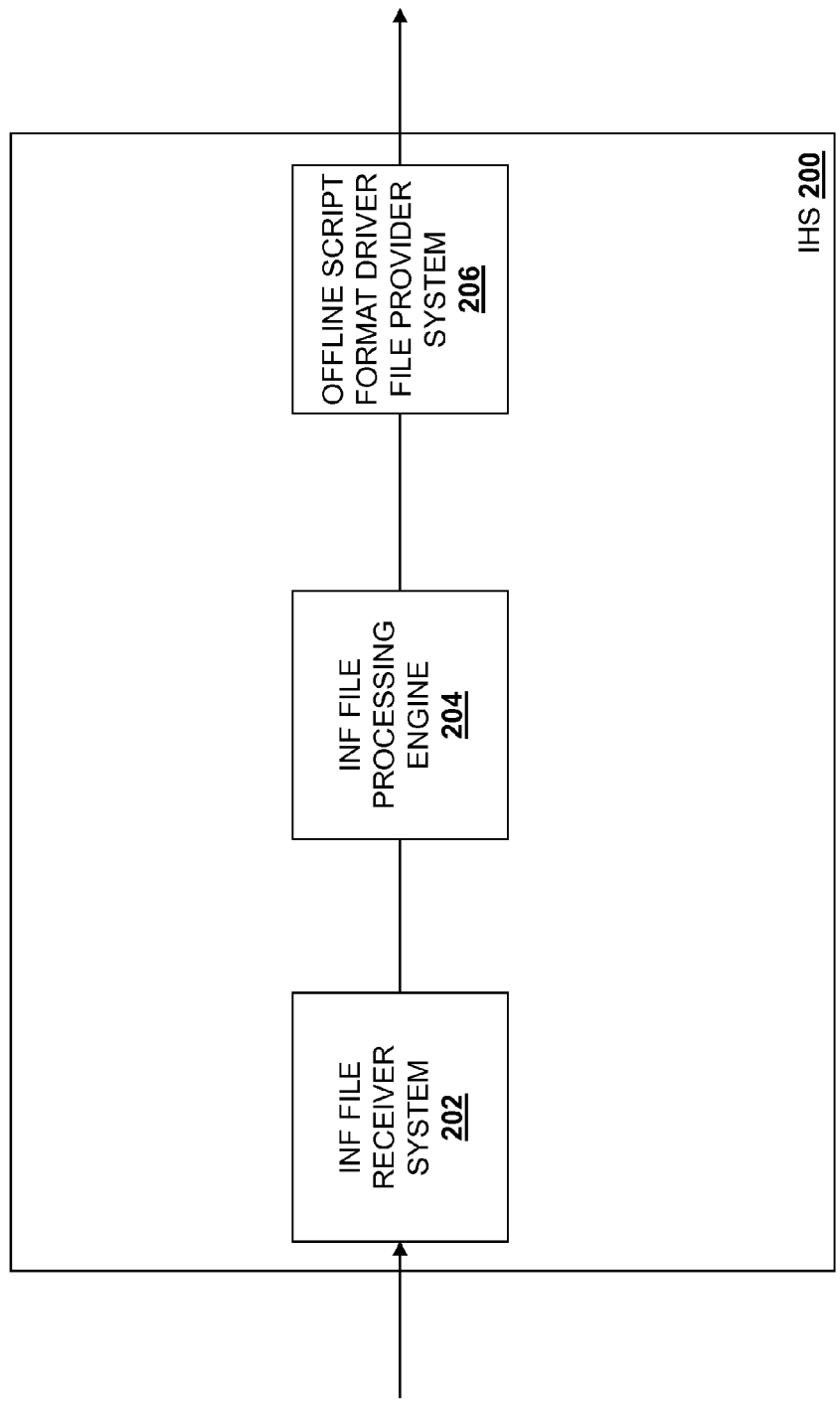
FIG. 2 is a schematic view illustrating an embodiment of an information handling system.

Referring now to FIG. 2, an embodiment of an IHS 200 is illustrated that is operable to convert INF driver files to offline script format driver files as discussed above. In an embodiment, the IHS 200 may be the IHS 100 and/or include some or all of the components of the IHS 100, discussed above with reference to FIG. 1. In a specific embodiment, the components of the IHS 200 may be included in or coupled to a server migration utility (SMU) tool in order to provide the SMU tool offline script format driver files created from conventional INF driver files. The IHS 200 includes an INF driver file receiver system 202 that may include combinations of hardware and software that operate to receive an INF file. For example, the INF driver file receiver system 202 may include network communication hardware and software, input/output (I/O) communication hardware and software, and/or a variety of other hardware and software known in the art that would be operable to receive an INF driver file (e.g., downloaded over a network, provided on a storage medium through a storage device the IHS 200, etc.)

The INF file receiver system 202 is coupled to an INF file processing engine 204. In an embodiment, the INF file processing engine 204 includes instructions that, when executed by a processor in the IHS 200, cause the processor to perform the functions of the INF file processing engine 204 as detailed according to the method 300 discussed below. The INF file processing engine 204 is coupled to an offline script format driver file provider system 206 that may include combinations of hardware and software that operate to provide an offline script format driver file to a destination IHS or IHS(s). For example, the offline script format driver file provider system 206 may include network communication hardware and software, input/output (I/O) communication hardware and software, buses, and/or a variety of other hardware and software known in the art that would be operable to provide offline script format driver files to a destination IHS or storage for later provision to a destination IHS (e.g., over a network, directly to a destination IHS, directly to a storage medium through a storage device the IHS 200, etc.)

Figure 3:
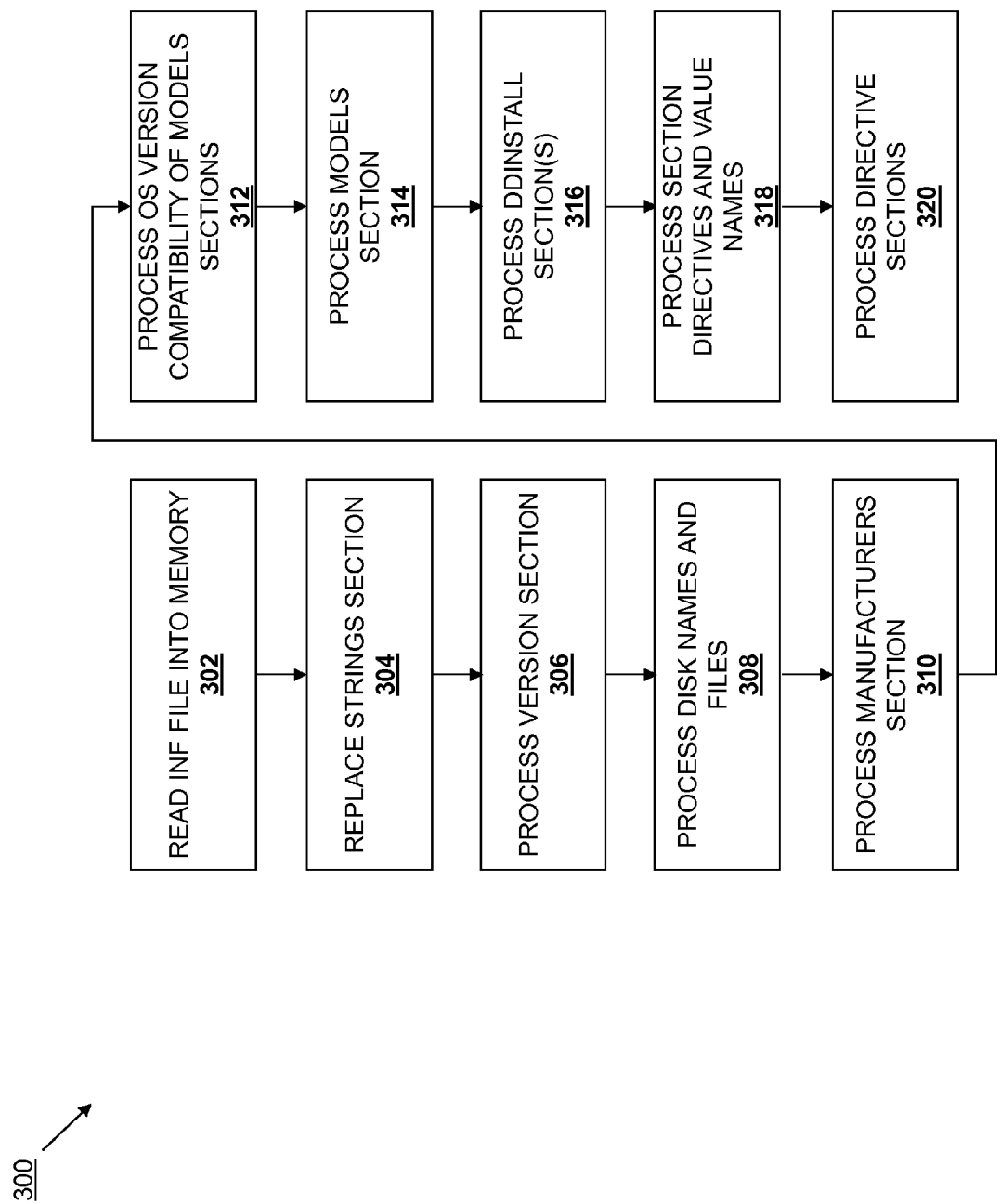
FIG. 3 is a flow chart illustrating an embodiment of a method for processing a collection of driver installation files.

Referring now to FIG. 3, an embodiment of a method 300 for processing INF driver files is illustrated. Each block of the method 300 will now be presented below following a separate heading for clarity of discussion and reference to FIG. 3, but such presentation should not be interpreted as requiring any specific ordering of the method blocks unless otherwise noted.

Read INF File into Memory

The method 300 begins at block 302 where an INF driver file is read into memory. In an embodiment, an INF driver file is provided to the IHS 200 through the INF file receiver system 202. For example, an offline WINDOWS® operating system image may be retargeted for a server that has a specific booting mechanism requiring a specific driver, and the INF driver file for that driver may be provided by the user to the INF file receiver system 202 (e.g., by directing the INF file receiver system 202 to the INF driver file over a network such as the Internet, providing a storage medium including the INF driver file in a storage device on the IHS 200, etc.) The INF file receiver system 202 then retrieves the INF driver file and provides the INF driver file to the INF file processing engine 204, which stores a representation of the INF driver file in a memory data structure (e.g., the system memory 114) in the IHS 200 such that the representation of INF driver file may be easily navigated (e.g., via code), as discussed below. For example, an offline script format driver file may be created and an entry in a [files] section of the offline script format driver file is added that provides an instruction to copy the INF file to the destination WINDOWS® install that looks like:
copy inffilename.inf %InjectWindowsDir%\inf\oem@OemInf@.inf
An embodiment of the entry above has the %InjectWindowsDir% including the DestinationDriveLetter:\\WindowsDirectory, with DestinationDriveLetter being the drive letter of the destination Windows operating system drive and WindowsDirectory being the name of the WINDOWS® directory on the destination drive (e.g., the name of the WINDOWS® directory is typically "Windows", however, in case the WINDOWS® installation is not the default of "Windows", whatever name is used may be subbed in as WindowsDirectory above.)

In an embodiment, @OemInf@ is determined by the offline script processor and is a 3 digit number that is unique on the destination file system. Throughout the method discussed below, the same unique 3 digit number may be used in the offline script format driver file as @OemInf@.

Replace Strings Sections

The method 300 then proceeds to block 304 where string section replacement is performed. As is known in the art, INF driver files may include Strings sections that provide variable to string substitution values. For example, an INF driver file may include a Strings section that associates the variable %MyManufacturer% with value data Manufacturer X, Inc. (e.g., MyManufacturer="Manufacturer X, Inc."). In an embodiment, at block 304, the INF file processing engine 204 parses the representation of the INF driver file in the memory data structure and replaces each variable (e.g., %MyManufacturer%) in the representation of the INF driver file in the memory data structure with the associated value data in the Strings section of the INF driver file (e.g., "Manufacturer X, Inc."). For example, variables in INF driver files are formatted by including a percentage sign on either side of the variable (e.g., %MyManufacturer%.) Thus, in an embodiment of block 304 of the method 300, the INF file processing engine 204 parses the text to find variables defined according to this format, and replaces those variables with associated value data in the strings section that correspond to those variables.

Process Version Section

The method 300 then proceeds to block 306 where the version section is processed. As is known in the art, INF driver files may include version sections that provide general information about the driver and type of device the driver supports. In an embodiment, at block 306, the INF file processing engine 204 may first test the version section for validity. For example, the INF file processing engine 204 may test for the validity of the version section by testing the representation of the INF driver file in the memory data structure for all required value names and their associated values, as is known in the art. If the version section is not valid, the INF file processing engine 204 may exit and notify the user that the INF driver file is invalid. If the version section is valid, the INF file processing engine 204 will then capture the version data in the representation of the INF driver file in the memory data structure and the Class Globally Unique Identifier (GUID) in the representation of the INF driver file in the memory data structure, and store the version data and Class GUID (which may be referred to henceforth as simply "ClassGUID") in a separate storage area for later access (e.g., so that the representation of the INF driver file in the memory data structure does not need to be reparsed to retrieve them.) Furthermore, the INF file processing engine 204 may also determine whether a CatalogFile value name exists in the INF driver file. If a CalalogFile value name exists, the INF file processing engine will queue the creation of a line in an offline script format driver file that provides for a file copy operation that is operable to copy the catalog (CAT) file (which may be referred to henceforth as "catalogfile.cat") to the destination that is required by the operating system. The INF file processing engine 204 will also capture the provider value data in the INF driver file and store it in a separate storage area for later access (e.g., so that the representation of the INF driver file in the memory data structure does not need to be reparsed to retrieve them.) In an embodiment, corresponding entries for the offline script format driver file created from the processing of the service-install-section section (e.g., a script line in the [files] section of the offline script format driver file) may result in the following lines in an example where the destination WINDOWS® image is WINDOWS® 2003 thru WINDOWS® 2008:
Copy catalogfile.cat %InjectWindowsDir%\system32\CatRoot\{F750E6C3-38EE-11D1-85E5-00C04FC295EE}\oem%OemInfcYo.cat.

Process Disk Names and Files

The method 300 then proceeds to block 308 where disk names and files are processed. As is known in the art, INF driver files may include disk names and files in the SourceDiskFiles and SourceDiskNames sections. The SourceDiskNames section provides the list of distribution disks that contain the files required for installation and operation of the driver, while the SourceDiskFiles section provides the list of files used during installation of the driver and their associated disks and directories on the disks. In an embodiment, at block 308, the INF file processing engine 204 may process the SourceDiskNames section (as provided in the representation of the INF file in the memory data structure) to retrieve disk identification data, and that disk identification data may then be combined with SourceDiskFiles data that references the SourceDiskNames disk identification data (as provided in the representation of the INF file in the memory data structure) in order to get a list of disk names, and files within those disk names, as contained in the SourceDiskFiles section. The processing of the SourceDiskFiles section in the INF driver file may be based on a desired operating system architecture that may include a x86 (32-bit) operating system architecture, an amd64 (64-bit) operating system architecture, and/or any of the operating system architectures discussed herein. In one example, processing the SourceDiskFlles section in the INF driver file based on a desired operating system architecture may include determining, using the representation of the INF file in the memory data structure, which SourceDiskFiles section to process based on the desired destination operating system architecture. The INF file processing engine 204 will then store the list of disk names and files within those disk names in a separate storage area for later access so that the representation of the INF driver file in the memory data structure does not need to be reparsed.

Process DestinationDirs and File-List-Section Sections

The various value names in the DestinationDirs section are names of file-list-section sections with the exception of the DefaultDestDir value name. The values of all the value names in the DestinationDirs section are pointers to the directory on the destination WINDOWS® OS volume, eg. Filelistsectionname=10,\SysWOW64. The first value is the dirid which is a number. The dirid numbers correspond to directories. The dirid values can be found in the WINDOWS® Driver Kit documentation. The second value is a subdirectory below the dirid defined directory. The DefaultDestDir value name is used where copy, rename or delete operations don't reference a specific file-list-section section. The format for the values used for the DefaultDestDir value name is the same as the other named value names. Substitution of the dirid number with the real directory name plus the subdirectory (if it exists) should be done at this time and stored with a correlation to the file-list-section name for later retrieval during the processing of the CopyFiles, RenFiles and DelFiles directives processing.

Process Manufacturers Section

The method 300 then proceeds to block 310 where manufacturers section is processed. As is known in the art, INF driver files may include a Manufacturers section that includes information that, once processed, may be used to identify the Models section names in the INF file and which operating system versions and architectures are supported by the INF file and drivers. In an embodiment, at block 310, the INF file processing engine 204 may create a list of all possible Models sections from value data included in the Manufacturers value name in the Manufacturers section of the INF driver file. As is known in the art, there can be more than one line in the Manufacturers section of the INF driver file, and thus in some examples, the INF file processing engine 204 will read every line in the Manufacturers section of the INF driver file to retrieve and create the list of all possible Models sections. The INF file processing engine 204 then determines which Models sections support which operating system versions from the list of all possible Models sections. This information is stored for later usage and retrieval.

Process Operating System Version Compatibility of Models Sections

The method 300 then proceeds to block 312 where an operating system version compatibility of a Models section is processed. As is known in the art, INF driver files may include a Models section that includes an operating system compatibility decoration that provides operating system compatibility details for the specific models of the hardware listed within that specific Models section. In an embodiment, at block 312, the INF file processing engine 204 may first determine the operating system compatibility of the Models section in representation of the INF driver file in the memory data structure using the decoration of the Models section name. As is known in the art, the Models section name in the INF driver file may include no decoration or decorations such as "x86" with no operating system version, "amd64" with no operating system version, and/or a variety of other decorations known in the art. In one example, if the decoration of the Models section name is blank or no decoration is included, the INF file processing engine 204 may determine that the INF driver file is compatible with all operating system versions and architectures. In another example, if the decoration of the Models section name includes "x86" with no operating system version, the INF file processing engine 204 may determine that the INF driver file is compatible with all operating system versions and only 32-bit architecture. In another example, if the decoration of the Models section name includes "amd64" with no operating system version, the INF file processing engine 204 may determine that the INF driver file is compatible with all operating system versions and only amd64 architecture. While a few examples of determining the operating system compatibility of the Models section in representation of the INF driver file in the memory data structure using the decoration of the Models section name have been provided, current WINDOWS® Driver Kit documentation may be referenced for information about how to determine operating system compatibilities using the decoration in the Models section name in the INF driver file (e.g., under Device and Driver Installation→Reference→INF File Sections and Directives→INF Sections→INF Manufacturer Section→Comment topic).

The INF file processing engine 204 may then store which Models section in the INF driver file is compatible with which operating system versions and architectures in a separate storage area for later access (e.g., so that the representation of the INF driver file in the memory data structure does not need to be reparsed to retrieve them.), and the that information may be used in creating the offline script format driver file.

Process Models Sections

The method 300 then proceeds to block 314 where a Models section is processed. As is known in the art, INF driver files may include a Models section that provides the Plug and Play (PnP) hardware identifications that the INF driver file is compatible with. In an embodiment, at block 312, the INF file processing engine 204 locates a first Models section in the list of all possible Models sections created at block 310 of the method 300. The INF file processing engine 204 then reads at least one line of this first Models section and stores the device-description, the install-section-name (i.e., the Device Driver install (DDInstall) section name), the hardware identification (hardware-id), and the compatibility identification (compatible-id) in that at least one line of that first Models section. The method 300 may then proceed to block 314 to process the DDInstall section in the first Models section using the DDInstall section name and store the additional value data gathered, as discussed below. In embodiments where there are no lines in the Models section, the operating system version that matches the operating system decoration on that Models section will be determined to be unsupported and will be marked as unsupported in the memory data structure. Every operating system version between the empty Models section and the next operating system version represented as a decorated Models section is unsupported. An undecorated Models section means that it supports all operating system versions. If there is an empty undecorated models section but there are also non-empty decorated sections then the decorated sections take precedent. See the WINDOWS® Driver Kit documentation for further details. In an embodiment, the processing on each line in the Models section may result in the corresponding lines in the offline script format driver file:
[A "\ControlSet00%Current%\Control\CriticalDevice Database\hardware-id"]
A ClassGUID: Sz="ClassGUID"
A Service: Sz="ServiceName"
In an embodiment, values for the hardware-id, ClassGUID and ServiceName above may be obtained from processing the Models section line, Version section, and the AddService directive from the DDInstall[.processordecoration].Services section, respectively.

PROCESS DDINSTALL (Also Known as Install-Section-Name) SECTION(S)

The method 300 then proceeds to block 316 where DDInstall section(s) are processed. As is known in the art, Models sections in INF driver files include DDInstall sections that provide device driver installation details. The DDInstall section may be decorated with a processor architecture decoration (e.g., .nt, .ntx86, .ntamd64, etc., as described in the WINDOWS® Driver Kit documentation.) The DDInstall word used here is substituted with the install-section-name as gathered in the processing above according to the PROCESS MODELS SECTION. In an embodiment, at block 316, the INF file processing engine 204 processes each DDInstall section in the representation of the INF driver file in the memory data structure including, but not limited to, DDInstall, DDInstall.Services, DDInstall.HW, DDInstall.CoInstallers, DDInstall.FactDef, DDInstall. LogConfigOverride, DD Install. Interfaces and/or DDInstall.WMI. If the DDInstall section is decorated with a processor architecture decoration, then the other sections need to have the decoration as well, e.g., DDInstall.ntx86 may have a DDInstall.ntx86.Services section. The INF file processing engine is operable to loop through each of the lines in the first Models section located in block 314 one at a time and process the section directives in each DDInstall section as discussed with respect to block 318 below. When the section directives in each of the DDINstall section of the first Models section have been processed, the INF file processing engine 204 will then begin processing the other Models sections (e.g., a second Models section, a third Models section, etc.) in the INF driver file.

PROCESS DDINSTALL[.processordecoration].Services SECTIONS

DDInstall[.processordecoration].Services sections must contain one or more AddServices directives. Process all the directives as specified below.

PROCESS DDINSTALL[.processordecoration].HW, .CoInstallers, .FactDef, .LogConfigOverride, .Interfaces, and .WMI SECTIONS While it is not necessary to process the DDINSTALL[.processordecoration].HW section and associated entries, the DDINSTALL[.processordecoration].CoInstallers sections and associated entries, the DDINSTALL[.processordecoration].FactDef sections and associated entries, the DDINSTALL[.processordecoration].LogConfigOverride sections and associated entries, the DDINSTALL[.processordecoration].Interfaces sections and associated entries, and the DDINSTALL[.processordecoration].WMI sections and associated entries of the INF file in order to allow a target operating system to boot, more complete processing of the INF file may include performing a method block that performs such processing.

Process Section Directives and Value Names

The method 300 then proceeds to block 318 where section directives and value names are processed. In an embodiment, block 318 of the method 300 may be performed during the processing of any sections of the INF file that include directives, as directives can appear in almost any section of the INF file, and those directives will be processed according the method 300 using substantially similar operations regardless of which section the directive is located. While a few examples of section directive information in DDInstall sections are discussed below, DDInstall sections are not the only sections of the INF file with section directives, as other sections of the INF file may have one or more applicable section directives as detailed by current WINDOWS® Driver Kit documentation (e.g., under Device and Driver Installation→Reference→INF File Sections and Directives→INF Directives). Furthermore, some sections of the INF file may have non-directive lines, and those non-directive lines may require special operations performed during the method 300 (e.g., for sections in the INF file that are only referred to by directives that have section references in the value data.)

As is known in the art, Models sections in INF driver files include DDInstall sections that include section directives and value names that provide various details about the install process such as, for example, where a file is to be copied, details about various registry adds, deletes, or changes, etc. In an embodiment, at block 318, the INF file processing engine 204 may process the section directives and value names, and if a directive points to another section or other sections, the INF file processing engine 204 may process that section or those sections and their section directives and value names. For example, for each directive, there may be references to another section, and that section may have more directives that refer to additional sections for processing. Such sections may be processed recursively at block 318, looping back for continued processing. However, in cases where another INF file is referenced, the method 300 may start from beginning unless the reference is only to a specific section of that INF file, in which case recursive processing continues on that INF file. Examples of some of the section directives that may be processed and some of the actions that may be taken during that processing are provided below. However, current WINDOWS® Driver Kit documentation may be referenced for information about other section directives that may be processed at block 318. Such sections may or may not be mentioned below, and while their processing may not be necessary to allow a target operating system to boot, more complete processing of the INF file may include performing a method block that performs such processing.

In one example, an AddInterface section directive may be included in a DDInstall.Interfaces section of a Models section. For example, an AddInterfaces section directive may be provided in an INF driver file as AddInterface={InterfaceClassGUID} [,[reference string] [,add-interface-section] [,flags]]]. Processing of an AddInterface section directive may include recording the InterfaceClassGUID for later use, and examples of the processing of an add-interface-section section are provided below for different add-interface-section values.

In another example, an AddPowerSetting section directive may be included in a DDInstall section, a DDinstall.HW section, a DDInstall.CoInstallers section, a ClassInstall32 section, a ClassInstall32.ntx86 section, a ClassInstall32.ntia64 section, a ClassInstall32.ntamd64 section, and/or any ClassInstall32<os_architecture_decoration> used for supporting an operating system architecture. For example, an AddPowerSetting section directive may be provided in an INF driver file as AddPowerSetting=add-power-setting-section[add-power-setting-section]. Examples of processing of an add-power-setting-section section are provided below for different add-power-setting-section values.

In another example, an AddProperty section directive may be included in a DDInstall section, a DDInstall.nt section, a DDinstall.ntx86 section, a DDInstall.ntia64 section, a DDInstall.ntamd64 section, a ClassInstall32 section, a ClassInstall32.ntx86 section, a ClassInstall32.ntia64 section, a ClassInstall32.ntamd64 section, any ClassInstall32<os_architecture_decoration> used for supporting an operating system architecture, an interface-install-section section, an interface-install-section.nt section, an interface-install-section.ntx86 section, an interface-install-section.ntia64 section, an interface-install-section.ntamd64 section, and/or an add-interface-section section. For example, an AddProperty section directive may be provided in an INF driver file as AddProperty=add-property-section[,add-property-section]. Examples of processing of an add-property-section section are provided below for different add-property-section values.

In another example, an AddReg section directive may be included in a DDInstall section, a DDInstall.HW section, a DDinstall.CoInstallers section, a ClassInstall32 section, a ClassInstall32.ntx86 section, a ClassInstall32.ntia64 section, a ClassInstall32.ntamd64 section, and/or any ClassInstall32<os_architecture_decoration> used for supporting an operating system architecture. For example, an AddReg section directive may be provided in an INF driver file as AddReg=add-registry-section[,add-registry-section]. Processing of an AddReg section directive may include processing service-install-section sections and recording the resulting registry changes, and creating lines for the offline script format driver file depending on how many registry changes were recorded. The example lines are illustrated in the add-registry section processing below.

In another example, an AddService section directive may be included in a DDInstall.Services section. For example, an AddService section directive may be provided in an INF driver file as AddService=ServiceName,[flags],service-install-section,[event-log-install-section[,[EventLogType][, EventName]]] Processing of an AddService section directive may include recording ServiceName in the memory data structure, recording flags in the memory data structure, processing service-install-section sections and recording the resulting registry changes, and creating lines for the offline script format driver file depending on how many registry changes were recorded. While it is not necessary to process the eventlog section and associated entries of the INF file in order to allow a target operating system to boot, more complete processing of the INF file may include performing a method block that performs such processing. The examples lines are illustrated in the service-install-section processing below.

In another example, a BitReg section directive may be included in a DDInstall section, a DDinstall.HW section, a DDInstall.CoInstallers section, a ClassInstall32 section, a ClassInstall32.ntx86 section, a ClassInstall32.ntia64 section, a ClassInstall32.ntamd64 section, and/or any ClassInstall32<os_architecture_decoration> used for supporting an operating system architecture. For example, a BitReg section directive may be provided in an INF driver file as BiReg=bit-registry-section[,bit-registry-section]. Processing of a BitReg section directive may include processing each bit-registry-section and recording the resulting registry changes, and creating lines for the offline script format driver file depending on how many registry changes were recorded. The example lines are illustrated in the bit-registry-section processing below.

In another example, a CopyFiles section directive may be included in a DDInstall section, a DDInstall.CoInstallers section, a ClassInstall32 section, a ClassInstall32.ntx86 section, a ClassInstall32.ntia64 section, a ClassInstall32.ntamd64 section, and/or any ClassInstall32<os_architecture_decoration> used for supporting an operating system architecture. For example, a CopyFiles section directive may be provided in an INF driver file as CopyFiles=@filename|file-list-section[,file-list-section]. Processing of a CopyFiles section directive may include determining if @filename is specified. If the @filename is specified, it may be determined whether the file-list-section sections are specified. If the file-list-section sections are specified, the file-list-section sections are processed and the resulting registry changes are recorded, and lines are created for the offline script format driver file such that the files will be copied, depending on how many registry changes were recorded. If @filename is supplied then the result of the processing DefaultDestDir directory value from the DestinationDirs section is used. Henceforth this is referred to an DestinationDefDir. An example would produce the following lines in the [files] section of the offline driver script:
copy sourcediskandpath:/filename DestinationDefDir:/filename In another example, a CopyINF section directive may be included in a DDInstall section. For example, a CopyINF section directive may be provided in an INF driver file as CopyINF=filename1.inf[,filename2.inf]. Processing of a CopyINF section directive may include creating lines for the offline script format driver file. Example of lines created for one current version of WINDOWS® may include the following entry under the [files] section of the offline script format driver file: copy sourcediskandpath:/filename1.inf destinationdiskandpath:/filename1.inf, wherein sourcediskandpath is the path to the INF file being processed and destinationdiskandpath is the drive letter of the destination offline WINDOWS® image and the default installation directory of the INF files/windows/inf. However, different versions of WINDOWS® may result in a different destinationdiskandpath line(s) created in response to processing the CopyINF section directive.

In another example, a DelFiles section directive may be included in a DDInstall section, a DDInstall.CoInstallers section, a ClassInstall32 section, a ClassInstall32.ntx86 section, a ClassInstall32.ntia64 section, a ClassInstall32.ntamd64 section, and/or any ClassInstall32<os_architecture_decoration> used for supporting an operating system architecture. For example, a DelFiles section directive may be provided in an INF driver file as DelFiles=file-list-section[, file-list-section]. When the file-list-section sections are specified, processing of a DelFiles section directive may include processing those file-list-sections and recording the resulting registry changes, along with the creating of lines for the offline script format driver file such that the files will be deleted. The example lines are illustrated in the file-list-section processing below.

In another example, a DelProperty section directive may be included in a DDInstall section, a DDInstall.nt section, a DDinstall.ntx86 section, a DDInstall.ntia64 section, a DDInstall.ntamd64 section, a ClassInstall32 section, a ClassInstall32.ntx86 section, a ClassInstall32.ntia64 section, a ClassInstall32.ntamd64 section, any ClassInstall32<os_architecture_decoration> used for supporting an operating system architecture, an interface-install-section section, an interface-install-section.nt section, an interface-install-section.ntx86 section, an interface-install-section.ntia64 section, an interface-install-section.ntamd64 section, and/or an add-interface-section section. For example, a DelProperty section directive may be provided in an INF driver file as DelProperty=del-property-section[,del-property-section].
Examples of processing of an DelProperty section are provided below for different DelProperty section values In another example, a DelReg section directive may be included in a DDInstall section, a DDInstall.HW section, a DDInstall.CoInstallers section, a ClassInstall32 section, a ClassInstall32.ntx86 section, a ClassInstall32.ntia64 section, a ClassInstall32.ntamd64 section, and/or any ClassInstall32<os_architecture_decoration> used for supporting an operating system architecture. For example, a DelReg section directive may be provided in an INF driver file as DelReg=del-registry-section[,del-registry-section]. Processing of a DelReg section directive may be substantially similar to the processing of an AddReg section directive, with the exception that lines created for the offline script format driver file will correspond to a registry deletion operation. The example lines are illustrated in the del-registry-section processing below.

In another example, a DelService section directive may be included in a DDInstall.Services section. For example, a DelServices section directive may be provided in an INF driver file as DelService=ServiceName[,[flags][EventLogType][,EventName]]. Processing of a DelService section directive may include creating a line that provide for registry deletion for the offline script format driver file, for each DelService line. An example of a line created for one current version of WINDOWS® may include the following [D HKEY LOCAL MACHINE\System\%CurrentControlSet%\services\[ServiceName].

In another example, a DriverVer section directive may be included in a Version section and/or a DDInstall section. For example, a DriverVer section directive may be provided in an INF driver file as DriverVer=mm/dd/yyyy[,w.x.y.z]. Processing of a DriverVer section directive may include parsing date and version number information and storing that information in a memory data structure for use when creating comments and registry creation entries for the offline script format driver file.

While it is not necessary to process the featurescore section directives and associated entries, hardwareid section directives and associated entries, ini2reg section directives and associated entries, logconfig section directives and associated entries, profileitems section directives and associated entries, the AddInterface section directive and associated entries, the AddPowerSetting section directive and associated entries, the AddProperty section directive and associated entries, and the DelProperty section directive and associated entries of the INF file in order to allow a target operating system to boot, more complete processing of the INF file may include performing a method block that performs such processing.

In another example, a RegisterDlls section directive may be included in a DDInstall section. For example, a RegisterDlls section directive may be provided in an INF driver file as RegisterDlls=register-dll-section[,unregister-dll-section]. Processing of a RegisterDlls section directive may include processing register-dll-section sections and recording resulting registry changes, and then creating lines for the offline script format driver file, depending on how many registry changes were recorded.

In another example, a RenFiles section directive may be included in a DDInstall section, a DDInstall.CoInstallers section, a ClassInstall32 section, a ClassInstall32.ntx86 section, a ClassInstall32.ntia64 section, a ClassInstall32.ntamd64 section, and/or any ClassInstall32<os_architecture_decoration> used for supporting an operating system architecture. For example, a RenFiles section directive may be provided in an INF driver file as RenFiles=file-list-section[,file-list-section]. If the file-list-section sections are specified, processing of a RenFiles section directive may include processing the file-list-section sections and recording the resulting registry changes, along with creating the lines for the offline script format driver file such that files will be renamed, depending on how many registry changes were recorded.

In another example, a UnregisterDlls section directive may be included in a DDInstall section. For example, a UnregisterDlls section directive may be provided in an INF driver file as UnregisterDlls=unregister-dll-section[,unregister-dll-section]. Processing of a UnregisterDlls section directive may include processing unregister-dll-section sections and recording resulting registry changes, along with creating lines for the offline script format driver file depending on how many registry changes were recorded.

Process Directive Sections

The method 300 then proceeds to block 320 where directive sections are processed. As is known in the art, the section directives in the Models sections in INF driver files include directive sections that provide, for example, registry adds/deletes/changes or file adds/deletes/changes. As discussed above, any of those directive sections may be processed by the INF file processing engine 204 during the processing of the section directives and value names in block 318. Examples of some of the directive sections that may be processed and some of the actions that may be taken during that processing are provided below.

In one example, the directive section processed at block 320 may include a service-install-section that may be provided in the INF driver file as [service-install-section]. Examples of text in the service-install-section that are processed at block 320 include [DisplayName=name], [Description=description-string], [ServiceType=type-code], [StartType=start-code], [ErrorControl=error-control-level, [ServiceBinary=path-to-service], [StartName=driver-object-name], [AddReg=Add-registry-section[,add-registry-section] . . . ], DelReg=del-registry-section[,del-registry-section] . . . ], [BitReg=bit-registry-section[,bit-registry-section] . . . ], [LoadOrderGroup=load-order-group-name], [Dependencies=depend-on-item-name[,depend-on-item-name], and/or [Security="security-descriptor-string"] . . . ] (where %CurrentControlSet% is actually specified as that literal text so that it may be substituted at application time of the offline script format driver file when the ControlSet### can be determined by looking at the key HKY LOCAL MACHINE/System/Select and looking at the value of Current, getting the decimal value for that DWORD and replacing ### with that decimal value proceeding any values that are not three digit decimal values with one or two zeros.) Corresponding entries for the offline script format driver file created from the processing of the service-install-section section may result in the following lines: [A H KEY LOCAL MACHINE/System/%CurrentControlSet%/services/[ServiceName], A DisplayName :Sz="name", A Description "Sz="description-string", A ImagePath :Sz="system32/drivers/path-to-service"), A ErrorControl :DWord=error-control-level, A Start :DWord=start-code, A Type :DWord=type-code, and A Group :Sz+'load-order-group-name'. Section directives such as AddReg, DelReg, BitReg, and others may be processed to create the offline script format driver file. In an embodiment, during this process, another line may be added to the offline script format diver file that is not obtained from the processing of the INF file, but rather is generated by the offline script format driver file processing engine, and that line my include the following:

A Tag: DWord=@Tag1@

In an embodiment, @Tag1@ may be a number generated by processing the Tags in the offline image and adding the "1" to the end. Thus, for each Tag variable that is generated, a new number is generated that is greater than the last (e.g., @Tag1@, @Tag2@, @Tag3@, etc.) That variable may then be used later on in the offline script format driver file via the designations @Tag1@, @Tag2@, @Tag3@, etc.

Another line may be added to the offline script file at this time, and may include:

[A "\%CurrentControlSet%\Services\ServiceName\Parameters\PnPInterface"]

In another example, the directive section processed at block 320 may include an event-log-install-section that may be provided in the INF driver file as [event-log-install-section]. Examples of text in the event-log-install-section that are processed at block 320 include [AddReg=add-registry-section[,add-registry-section] . . . ], [DelReg=del-registry-section[,del-registry-section] . . . ], and [BitReg=bit-registry-section[,bit-registry-section] . . . ]. While the processing of the eventlog section and associated entries is not necessary in order to get the target OS to boot, such processing may be provided to accomplish a more complete processing of the INF file.

In another example, the directive section processed at block 320 may include any of a plurality of registry sections that may be provided in the INF driver file.

For example, an add-registry-section may be provided in the INF driver file. The flags field, if provided, may modify the resultant lines of text in the offline script format driver file in different ways (e.g., to cause the adding a registry entry, the deleting of a registry entry, the changing of the type of registry key that is passed to the registry, etc.). The add-registry-section may be provided as the following text that may be processed: [add-registry-section]; reg-root,[subkey],[value-entry-name],[flags],[value]; reg-root, [subkey], [value-entry-name], [flags], [value] . . . [[add-registry-section .security] "security-descriptor-string"]. Corresponding entries for the offline script format driver file created from the processing of the add-registry-section section may result in the following line: [Operation HKEY LOCAL MACHINE\subkey\], Operation value-entry-name :type=value, where type is determined by the flags and can have values such as Sz, DWord, Multi-Sz, Expand-Sz, or Binary, and Operation can be A (for add) or M (for modify) depending on the flags specified.

In another example, a del-registry-section provided in the INF driver file as [del-registry-section]; reg-root,[subkey], [value-entry-name],[flags],[value]; reg-root,[subkey],[value-entry-name],[flags],[value} . . . may be processed. The flags field, if provided, can modify the resultant lines of the offline script format drive file in different ways. Corresponding entries for the offline script format driver file created from the processing of the del-registry-section section may include: [D HKEY LOCAL MAHINE\subkey\] D value-entry-name :type=value.

In another example, a bit-registry-section as known in the art may be provided in the INF driver file as [bit-registry-section]; reg-root,[subkey],[value-entry-name],[flags], byte-mask, byte-to-modify; reg-root,[subkey],[value-entry-name],[flags] byte-mask, byte-to-modify, and may be processed. The flags field, if provided, can modify the resultant lines in the offline script format driver file in different ways. Corresponding entries for the offline script format driver file created from the processing of the bit-registry-section section may result in the following lines: [Operation HKEY LOCAL MACHINE\subkey\] Operation value-entryname :Binary—byte-mask, byte-to-modify, where Operation can be A (for add) or M (for modify) depending on the flags specified.

In another example, the directive section processed at block 320 may include a file-list-section that may be provided in the INF driver file as [file-list-section].

When referenced from a CopyFiles directive, examples of text in the file-list-section that are processed at block 320 include [file-list-section]; destination-file-name[,[source-file-name][,[unused][,flag]]] . . . [file-list-section.security] "security-descriptor-string". The flags field, if provided, can modify the resultant lines in the offline script format driver file in different ways. Corresponding entries for the offline script format driver file created from the processing of the file-list-section section may result in the following lines under the [files] section of the offline script format driver file: copy x:\temp\source-file-name c:\windows\destinationfile-name.

When referenced from a DelFiles directive, examples of text in the file-list-section that are processed at block 320 includes [file-list-section]; destination-file-name[flag]. The flags field, if provided, can modify the resultant lines in the offline script format driver file in different ways. Corresponding entries for the offline script format driver file created from the processing of the file-list-section section may result in the following lines under the [files] section of the offline script format driver file: del c:\windows\destination-file-name.

When referenced from a RenFiles directive, examples of text in the file-list-section that are processed at block 320 includes [file-list-section]; new-dest-file-name,old-source-file-name]. Corresponding entries for the offline script format driver file created from the processing of the file-list-section section may result in the following lines under the [files] section of the offline script format driver file: ren c:\windows/old-source-file-name c:\windows\new-dest-file-name.

In another example, the directive section processed at block 320 may include a log-config-section that may be provided in the INF driver file as [log-config-section]. Examples of text in the log-config-section that are processed at block 320 include [ConfigPriority=Priority_Value[,Config_Type], [DMAConfig=[DMAattrs:]DMANum[,DMANum] . . . ], [IOConfig=io-range[,io-range] . . . ], [MemConfig=mem-range[,mem-range] . . . ], [IRQConfig=IRQattrs:]IRQNum[, IRQNum] . . . ], [PcCardConfig=ConfigIndex[:[MemoryCardBase1][:MemoryCardBase2]][(attrs)]], and/or [MfCardConfig=ConfigRegBase:ConfigOptions[:loResourcesIndex][(attrs)] . . . ].

As discussed above, it is not necessary to process the featurescore section directives and associated entries, hardwareid section directives and associated entries, ini2reg section directives and associated entries, logconfig section directives and associated entries, profileitems section directives and associated entries, the AddInterface section directive and associated entries, the AddPowerSetting section directive and associated entries, the AddProperty section directive and associated entries, and the DelProperty section directive and associated entries of the INF file in order to allow a target operating system to boot, but more complete processing of the INF file may include performing a method block that performs such processing. Similarly, it is not necessary to process the event-log-install-section and associated entries or the log-config-section and associated entries of the INF file in order to allow a target operating system to boot, but more complete processing of the INF file may include performing a method block that performs such processing. When such complete processing is desired, the directive section processed at block 320 may include a profile-items-section that may be provided in the INF driver file as [profile-items-section]. Examples of text in the profile-items-section that are processed at block 320 include [Name=link-name[,name-attributes], [CMDLine=[dirid,[subdir],filename], [SubDir=path], [WorkingDir=wd-dirid,wd-subdir], [IconPath=icon-dirid,[icon-subdir],icon-filename], [IconIndex=index-value], [HotKey=hotkey-value], [Infotip=info-tip], and/or [DisplayResource="ResDllPath/ResDll",ResID]. Similarly, when such complete processing is desired, the directive section processed at block 320 may include a update-ini-section that may be provided in the INF driver file as [update-ini-section]. Examples of text in the update-ini-section that are processed at block 320 includes ini-file,ini-section[,old-ini-entry][,new-ini-entry][,flags] . . . . Similarly, when such complete processing is desired, the directive section processed at block 320 may include a update-inifields-section that may be provided in the INF driver file as [update-inifields-section]. Examples of text in the update-inifields-section that are processed at block 320 includes ini-file,ini-section, profile-name[,old-field][,new-foe;d][,flags] . . . . Similarly, when such complete processing is desired, the directive section processed at block 320 may include a ini-to-registry-section that may be provided in the INF driver file as [ini-to-registry-section]. Examples of text in the ini-to-registry-section that are processed at block 320 includes ini-file,ini-section,[ini-key],reg-root,subkey [,flags] . . . .

In another example, the directive section processed at block 320 may include a register-dll-section that may be provided in the INF driver file as [register-dll-section]. Examples of text in the register-dll-section that are processed at block 320 includes dirid, subdir, filename, registration flags[,[optional timeout][,argument]]. In an embodiment, processing the register-dll-section may include creating a set of in-memory entries that represent what the resultant registry entries should be, as is known in the art, so that a registry entry will execute the dll registration process when the IHS boots. For example, processing may include processing the dirid as is specified in the WINDOWS® Driver Kit Documentation. Corresponding entries for the offline script format driver file created from the processing of the file-list-section section may result in the following lines: [files] copy dirid\subdir\filename offlinewindowsdrive:\windows\system32, [A HKEY LOCAL MACHINE\Software\ Microsoft\Windows\CurrentVersion\RunOnce]. Uniquename, below, is a name that is generated and that is a unique registry value name under the key HKEY LOCAL MACHINE\Software\Microsoft\Windows\CurrentVersion\RunOnce.
If registration flags=FLG REGSVR DLLREGISTER or 0x00000001,
A UniqueName :Expand-Sz="rundll32.exe%systemroot %\system32\filename".
If registration flags=FLG REGSVR DLLINSTALL or 0x00000002,
A UniqueName :Expand-Sz="rundll32.exe/i%systemroot%\system32\filename".
If filename ends in .exe,
A UniqueName :Exapnd-Sz="%systemroot%\system32\filename [\RegSever|argument]".

In another example, the directive section processed at block 320 may include a unregister-dll-section that may be provided in the INF driver file as [unregister-dll-section]. Examples of text in the unregister-dll-section that are processed at block 320 includes dirid, subdir, filename, registration flags[,[optional timeout][,argument]]. In an embodiment, processing the unregister-dll-section may include creating a set of in-memory entries that represent what the resultant registry entries should be, as is known in the art, so that a registry entry will execute the dll unregistration process when the IHS boots. For example, processing may include processing the dirid as is specified in the WINDOWS® Driver Kit Documentation. Corresponding entries for the offline script format driver file created from the processing of the file-list-section section may result in the following lines: [A HKEY LOCAL MACHINE\Software\Microsoft\Windows\CurrentVersion\RunOnce]. Uniquename, below, is a name that is generated and that is a unique registry value name under the key HKEY LOCAL MACHINE\Software\Microsoft\Windows\CurrentVersion\RunOnce.
If registration flags=FLG REGSVR DLLREGISTER or 0x00000001,
A UniqueName :Exapnd-Sz="rundll32.exe /u%systemroot%\system32\filename".
If registration flags=FLG REGSVR DLLINSTALL or 0x00000002,
A UniqueName :Exapnd-Sz="rundll32.exe /u /i %systemroot%\system32\filename".
If filename ends in .exe,
A UniqueName :Exapnd-Sz="%systemroot%\system32\filename [\UnRegSever|argument]".

Following block 320, the INF driver file has been processed by the INF file processing engine 204 to produce an offline script format driver file, which is then provided to the offline script format driver file provider system 206. As discussed above, the offline script format driver file provider system 206 may be on the IHS 200 that is the destination IHS such that the INF driver file is converted to the offline script format driver file on the IHS that is to use it offline. In another embodiment, the offline script format driver file provider system 20606 may provide the offline script format driver file over a network to another IHS for storage and/or use.

An example of an offline script format driver file, created during the method 300, may include the following:

```
[set]
Current=@valnum=\Select\Current@
[files]
%fileOp1% qlsdm.dll            %InjectWindowsDir%\SysWOW64\
%fileOp1% qlco.dll             %InjectWindowsDir%\SysWOW64\qlco1006.dll
%fileOp1% qlsdmx64.dll         %InjectWindowsDir%\system32\qlsdm.dll
%fileOp1% qlcox64.dll          %InjectWindowsDir%\system32\qlco1006.dll
%fileOp1% Qlpropx64.dll        %InjectWindowsDir%\system32\QlPPFc.dll
%fileOp1% QlFcx64.exe          %InjectWindowsDir%\system32\QlFc.exe
%fileOp1% ql2300.sys           %InjectWindowsDir%\system32\drivers\
%fileOp1% ql2x00.inf           %InjectWindowsDir%\inf\oem@OemInf@.inf
%fileOp1% ql2300.cat           %InjectWindowsDir%\system32\CatRoot\{F750E6C3-38EE-11D1-
                               85E5-00C04FC295EE}\oem%OemInf%.cat
[A "\ControlSet00%Current%\Services\ql2300"]
A ErrorControl      : DWord = 0x00000001
A Start             : DWord = 0x00000000
A Type              : DWord = 0x00000001
A Group             : Sz = "SCSI Miniport"
A ImagePath         : Sz = system32\drivers\ql2300.sys
A Tag               : DWord = @Tag1@
[A "\ControlSet00%Current%\Services\ql2300\Parameters\PnPInterface"]
A "5" : DWord = 0x00000001
[A
"\ControlSet00%Current%\Control\CriticalDeviceDatabase\PCI#VEN__1077&DEV__2532&SUBS
YS__015C1077"]
A ClassGUID         : Sz = "{4D36E97B-E325-11CE-BFC1-08002BE10318}"
A Service           : Sz = "ql2300"
[A
"\ControlSet00%Current%\Control\CriticalDeviceDatabase\PCI#VEN__1077&DEV__2532&SUBS
```

```
YS_015D1077"]
A ClassGUID      : Sz = "{4D36E97B-E325-11CE-BFC1-08002BE10318}"
A Service        : Sz = "ql2300"
```

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. An offline script format driver file creation system, comprising:
a processing system;
a memory system coupled to the processing system and including instruction that, when executed by the processing system, cause the processing system to provide at least one engine that is configured to:
read a driver installation file into the memory system such that a representation of the driver installation file is stored in the memory system;
replace variables in the representation of the driver installation file with associated value data from a first section of the driver installation file that provides variable to string substitution values;
process a second section in the representation of the driver installation file that provides information about the driver installation file and a type of device the driver installation file supports, wherein the processing the second section includes capturing version data and a unique identifier in the representation of the driver installation file and storing that version data and unique identifier in the memory system;
process a third section in the representation of the driver installation file that provides a list of distribution disks that contain the files required for installation and operation of the driver installation file, a list of files used during installation of the driver installation file, and associated disks and directories on those disks, wherein the processing the third section includes retrieving disk identification data and combining the disk identification data with data that references the disk identification data in order to create and store a list of disk names and files within those disk names in the memory system;
process a fourth section in the representation of the driver installation file that includes information used to identify operating systems supported by the driver installation file, wherein the processing of the fourth section creates a list of all possible models sections from value data included in a manufacturer value name to determine which models sections support which operating systems;
process a fifth section in the representation of the driver installation file that includes operating system compatibility details for specific models of hardware, wherein the processing of the fifth section includes creating and storing information that describes which models section in the driver installation file is compatible with which operation system; and
process a sixth section in the representation of the driver installation file that includes plug and play hardware identifications that the driver installation file is compatible with and, for each portion of the sixth section that includes device driver installation details, process sections directives in that portion that include registry actions or file actions;
wherein the processing of the first section, the second section, the third section, the fourth section, the fifth section, and the sixth section provides an offline script format driver file that is configured to provide for offline driver installation in an information handling system (IHS) when an operating system in the IHS is not running.

2. The system of claim 1, wherein the memory system includes instruction that, when executed by the processing system, cause the processing system to provide the at least one engine that is configured to:
perform the offline driver installation to install a driver associated with the driver installation file when an instance of the operating system for the IHS is not operating.

3. The system of claim 1, wherein the driver installation file is processed to provide the offline script format driver file at runtime of the IHS.

4. The system of claim 1, wherein the offline script format driver file created from the driver installation file is stored in a network storage device.

5. The system of claim 1, wherein the offline script format driver file is provided over a network to the IHS.

6. The system of claim 1, wherein the processing the second section includes testing the second section for validity by testing for all required value names and their associated values.

7. The system of claim 1, wherein the at least one engine is further configured to:
create a registry entry line and a registry entry that, on first boot up of the IHS after an off line modification, allows the IHS to boot.

8. A first information handling system, comprising:
a processor coupled to a network;
a memory device coupled to the processor and including instruction that, when executed by the processor, cause the processor to:
read information (INF) files into the memory device such that a representation of the INF files is stored in the memory device;
replace variables in the representation of the INF file with associated value data from a Strings section of the INF files that provides variable to string substitution values;
process a Version section in the representation of the INF files by capturing version data and a unique identifier in the representation of the INF files and storing that version data and unique identifier in the memory device;
process a Disk Names and Files section in the representation of the INF files to retrieve disk identification data and combine the disk identification data with data that references the disk identification data in order to create and store a list of disk names and files within those disk names in the memory system;

process a Manufacturer section in the representation of the INF files to create a list of all possible models sections from value data included in a manufacturer value name to determine which models sections support which operating systems;

process a Operating System Version Compatibility of Models sections in the representation of the INF files to create and store information that describes which Models section in the driver installation file is compatible with which operation system; and process a Models section in the representation of the INF files, wherein for Device Driver install (DDInstall) sections of the Models section that includes device driver installation details, sections directives in that DDInstall section that include registry actions or file actions are processed;

wherein the processing of the Strings section, the Version section, the Disk Names and Files section, the Manufacturer section, the Operating System Version Compatibility of Models section, and the Models section provides an offline script format driver file that is configured to provide for offline driver installation in a second IHS when an operating system in the second IHS is not running.

9. The first IHS of claim 8, wherein the memory system includes instruction that, when executed by the processing system, cause the processing system to provide the at least one engine that is configured to:

perform the offline driver installation to install a driver associated with the driver installation file when an instance of the operating system for the second IHS is not operating.

10. The first IHS of claim 8, wherein the driver installation file is processed to provide the offline script format driver file at runtime of the second IHS.

11. The first IHS of claim 8, wherein the offline script format driver file created from the driver installation file is stored in a network storage device.

12. The first IHS of claim 8, wherein the offline script format driver file is provided over the network to the second IHS.

13. The first IHS of claim 8, wherein the processing the second section includes testing the second section for validity by testing for all required value names and their associated values.

14. The first IHS of claim 8, wherein the memory device further includes instruction that, when executed by the processor, cause the processor to:

create a registry entry line and a registry entry that, on first boot up of the second IHS after an offline modification, allows the second IHS to boot.

15. A method for creating an offline script format driver file, comprising:

reading information (INF) files into a memory data structure such that a representation of the INF files is stored in the memory data structure;

replacing variables in the representation of the INF file with associated value data from a Strings section of the INF files that provides variable to string substitution values;

processing a Version section in the representation of the INF files by capturing version data and a unique identifier in the representation of the INF files and storing that version data and unique identifier in the memory data structure;

processing a Disk Names and Files section in the representation of the INF files to retrieve disk identification data and combine the disk identification data with data that references the disk identification data in order to create and store a list of disk names and files within those disk names in the memory data structure;

processing a Manufacturer section in the representation of the INF files to create a list of all possible models sections from value data included in a manufacturers value name to determine which models sections support which operating systems;

processing a Operating System Version Compatibility of Models sections ihn the representation of the INF files to create and store information that describes which Models section in the driver installation file is compatible with which operation system; and processing a Models section in the representation of the INF files, wherein for Device Driver install (DDInstall) sections of the Models section that include device driver installation details, sections directives in that DDInstall section that include registry actions or file actions are processed;

wherein the processing of the Strings section, the Version section, the Disk Names and Files section, the Manufacturer section, the Operating System Version Compatibility of a Models section, and the Models section provides an offline script format driver file that is configured to provide for offline driver installation in an information handling system (IHS) when an operating system in the IHS is not running.

16. The method of claim 15, further comprising:

performing the offline driver installation to install a driver associated with the driver installation file when an instance of the operating system for the IHS is not operating.

17. The method of claim 15, wherein the driver installation file is processed to provide the offline script format driver file at runtime of the IHS.

18. The method of claim 15, further comprising:

storing the offline script format driver file in a network storage device.

19. The method of claim 15, further comprising:

providing the off line script format driver file over a network to the IHS.

20. The method of claim 15, further comprising:

creating a registry entry line and a registry entry that, on first boot up of the IHS after an off line modification, allows the IHS to boot.

* * * * *